(12) United States Patent
Hunt et al.

(10) Patent No.: US 11,212,963 B2
(45) Date of Patent: Jan. 4, 2022

(54) FAILSAFE MODE FOR ARTICULATING HARVESTING HEADER

(71) Applicant: CNH Industrial America LLC, New Holland, PA (US)

(72) Inventors: Cory Hunt, Millersville, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 188 days.

(21) Appl. No.: 16/413,662

(22) Filed: May 16, 2019

(65) Prior Publication Data

US 2020/0359562 A1 Nov. 19, 2020

(51) Int. Cl.
*A01D 41/14* (2006.01)
*A01D 34/04* (2006.01)
*A01D 34/14* (2006.01)
*A01D 34/24* (2006.01)
*A01D 34/28* (2006.01)

(52) U.S. Cl.
CPC .......... *A01D 41/141* (2013.01); *A01D 34/04* (2013.01); *A01D 34/14* (2013.01); *A01D 34/246* (2013.01); *A01D 34/28* (2013.01)

(58) Field of Classification Search
CPC ...... A01D 41/141; A01D 34/04; A01D 34/14; A01D 34/246; A01D 34/28; A01D 41/127; A01D 41/14
USPC ...................................................... 56/10.2 A
See application file for complete search history.

(56) References Cited

U.S. PATENT DOCUMENTS

| 5,673,543 | A | 10/1997 | Richardson et al. | |
|---|---|---|---|---|
| 6,675,568 | B2 | 1/2004 | Patterson et al. | |
| 9,148,988 | B2 | 10/2015 | Baker | |
| 10,130,025 | B2 | 11/2018 | Thorsell et al. | |
| 10,143,136 | B2 | 12/2018 | Sudhues et al. | |
| 2006/0020402 | A1* | 1/2006 | Bischoff | G07C 3/00 702/34 |
| 2017/0138018 | A1* | 5/2017 | Beschorner | E02F 9/267 |
| 2018/0025561 | A1* | 1/2018 | Bueermann | G07C 5/008 701/29.6 |
| 2018/0153102 | A1* | 6/2018 | Dunn | A01D 41/127 |
| 2018/0184592 | A1* | 7/2018 | Lehman | A01D 45/021 |
| 2019/0261555 | A1* | 8/2019 | Baldwin | A01D 34/008 |

(Continued)

FOREIGN PATENT DOCUMENTS

| CN | 108521799 A | 9/2018 |
|---|---|---|
| DE | 102017116633 A1 | 1/2019 |
| EP | 1564688 A1 | 8/2005 |

(Continued)

OTHER PUBLICATIONS

Extended European Search Report for EP Application No. 20175196.3 dated Oct. 29, 2020 (five pages).

*Primary Examiner* — Alicia Torres
*Assistant Examiner* — Matthew Ian Neal
(74) *Attorney, Agent, or Firm* — Peter K. Zacharias; Patrick M. Sheldrake

(57) ABSTRACT

A control system and method for operating an articulating header of a combine harvester in a failsafe mode. The method includes monitoring the articulating header, alerting a user when a fault condition is detected in the articulating header, and converting the articulating header to a non-articulating header in response to the fault condition so that the combine harvester may be operated in a failsafe mode.

21 Claims, 2 Drawing Sheets

(56) References Cited

U.S. PATENT DOCUMENTS

2020/0008354 A1\* 1/2020 Brimeyer ............. A01B 63/008

FOREIGN PATENT DOCUMENTS

| EP | 3254549 A1 | 12/2017 |
| EP | 3275300 A1 | 1/2018 |
| JP | H0767466 A | 3/1995 |
| JP | H10155328 A | 6/1998 |

\* cited by examiner

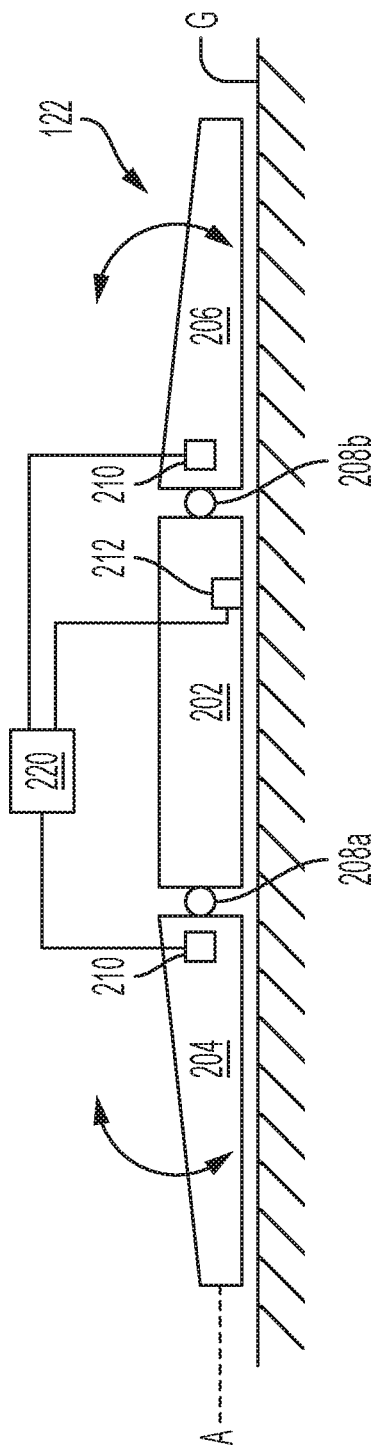
FIG. 2
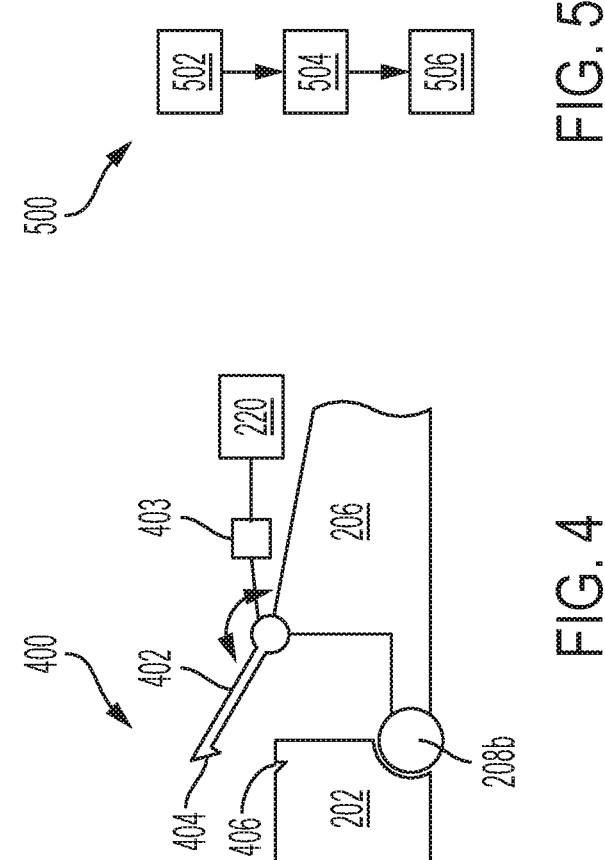
FIG. 5
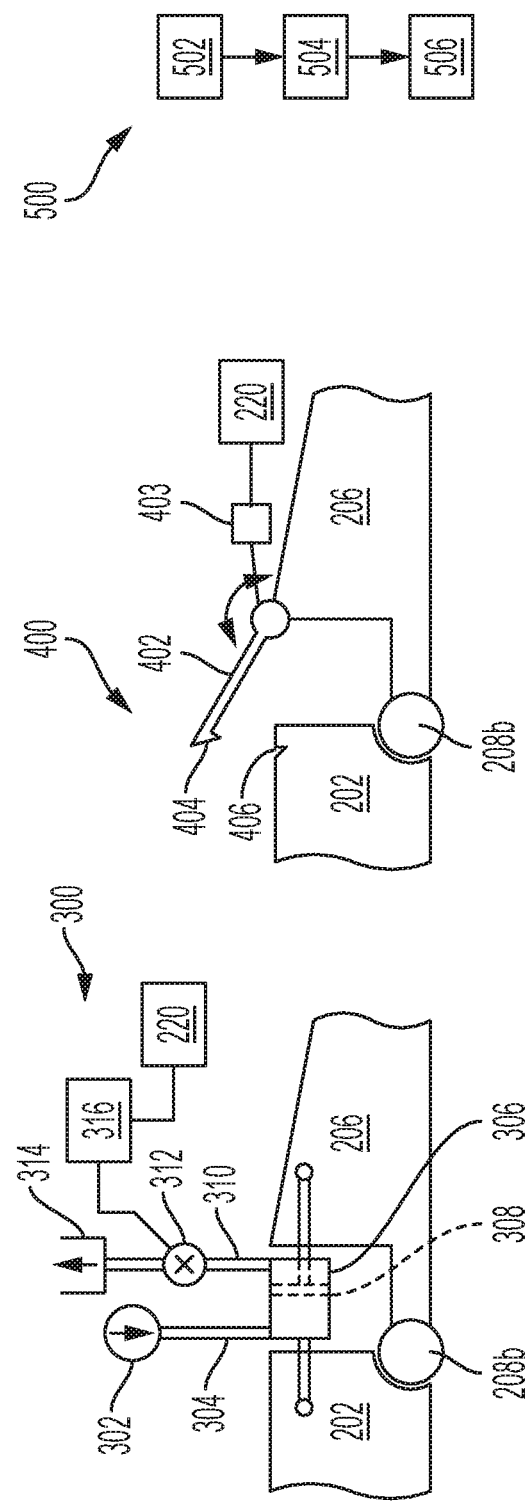
FIG. 4
FIG. 3

FAILSAFE MODE FOR ARTICULATING HARVESTING HEADER

FIELD OF THE INVENTION

The present invention relates generally to a control system for an articulating harvesting header, and a method of use thereof in the course of a failure mode.

BACKGROUND OF THE INVENTION

As is generally disclosed in U.S. Pat. No. 10,143,136, which is incorporated by reference herein in its entirety, the present invention concerns a multi-section header with several frame sections that are joined with each other for articulation and each form a partial working width of the header, wherein outer lateral frame sections are connected with a central frame section with each other by means of an adjustable relief element. A header of the aforementioned kind may be referred to in the art as an articulating header. Such an articulating header is disclosed in U.S. Pat. No. 6,675,568, which is also incorporated by reference herein in its entirety.

More particularly, an articulating header generally comprises a central frame section (also referred to herein as a center section) and two outer lateral frame sections (also referred to herein as lateral sections) joined for articulation thereto. Since the ground of a field across the total working width of the header does not remain flat, but can exhibit elevations and depressions, the lateral sections with their partial working widths are configured to adapt to the uneven soil contour by means of their articulated connection with each other. In particular, the lateral sections with their free ends can pivot up or down relative to the center section in order to adapt in this way to a ground contour that is ascending or descending in a lateral direction relative to the transverse axis of the central frame section.

Although not necessarily disclosed in those patents, an elevation sensor may be used to determine the distance between the center section and the ground beneath, and an angular sensor may be used to determine the pivot angle of a particular lateral section with respect to the center section. The sensors provide feedback to the control system to ensure that the center section and the lateral frame sections are positioned at the proper elevations during a harvesting operation.

If, for any reason, the elevation sensor, the angular sensor, or any other component of the articulating header fails, then it would be beneficial to provide a failsafe mode so that the articulating header can continue to be used during a harvesting operation.

SUMMARY OF THE INVENTION

According to one aspect of the invention, a method for operating an articulating header of a combine harvester in a failsafe mode comprises: monitoring the articulating header; alerting a user when a fault condition is detected in the articulating header; and converting the articulating header to a non-articulating header in response to the fault condition so that the combine harvester may be operated in a failsafe mode.

According to another aspect of the invention, an articulating header of a combine harvester that is configured to be operated in a failsafe mode comprises: a controller that is configured to determine a fault condition in the articulating header; and means for converting the articulating header to a non-articulating header in response to the fault condition.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a schematic block diagram depicting a forward end view of the articulating header of the agricultural combine of FIG. 1.

FIG. 3 is a schematic block diagram depicting a hydraulic system for actuating one of the lateral sections of the articulating header of FIG. 2.

FIG. 4 is a schematic block diagram depicting a locking system for locking one of the lateral sections of the articulating header of FIG. 2.

FIG. 5 depicts an exemplary method of converting the articulating header to a non-articulating header.

DETAILED DESCRIPTION OF THE INVENTION

Figure 1:
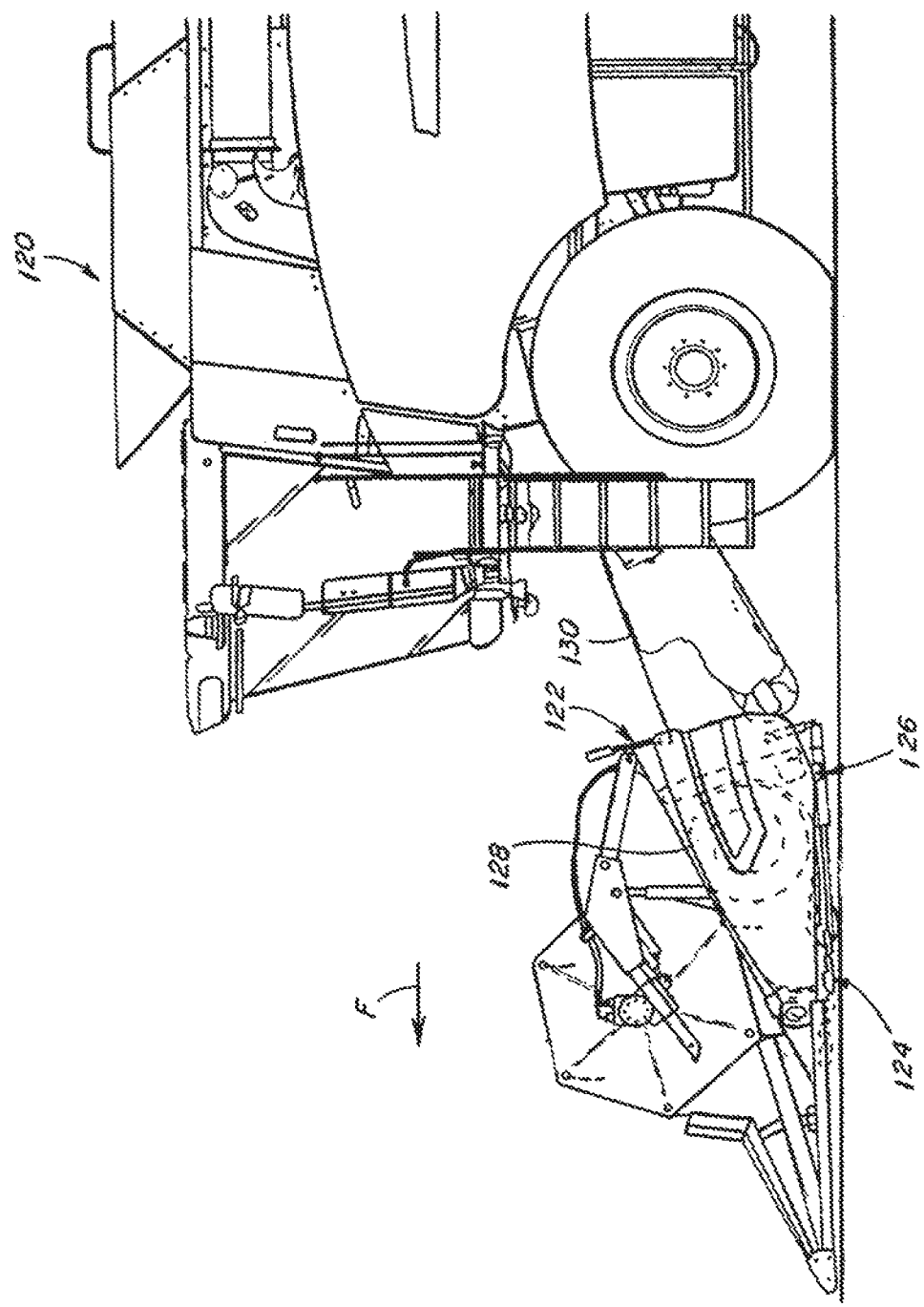
FIG. 1 is a simplified fragmentary side view of the front end of an agricultural combine.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

Referring now to the drawings, FIG. 1 depicts a self-propelled combine 120 including an articulating header 122. The articulating header 122 is shown symbolically in FIG. 1, and is not necessarily limited to the various components forming a part thereof, which will be described hereinafter.

The header 122 includes a cutterbar 124 that is a conventionally constructed and operable sickle type cutter made of steel and including an elongate end-to-end array of knife sections reciprocatingly movable in a side-to-side direction relative to fixed cutter guards, for severing crops from a field as combine 120 is moved forwardly thereover, as denoted by arrow 'F.' Header 122 additionally includes a conveyor arrangement 128 operable for gathering the cut crops, and conveying them to a center region of header 122, and into a feeder 130 of combine 120, in the well-known manner. Here, conveyor arrangement 128 is of a helical auger style, but it should be recognized and understood that, alternatively, the conveyor arrangement could be configured as a draper type or any other header type that is known to those skilled in the art.

Turning now to the diagram of FIG. 2, a forward end view of the articulating header 122 is shown. Header 122 includes center section 202, a left-side lateral frame section 204 and a right side lateral frame section 206. Lateral section 204 is pivotably mounted to center section 202 by a hinge 208a, and, likewise, lateral section 206 is pivotably mounted to center section 202 by a hinge 208b. Pivoting action of lateral sections 204 and 206 is denoted by the arrows of FIG. 2. An angular sensor 210 is associated with each lateral frame section 204, 206 for determining a pivoting angle between the respective lateral frame section 204, 206 and center section 202. Furthermore, an elevation sensor 212 is associated with center section 202 for determining a distance between center section 202 and the ground surface G.

Angular sensor 210 may be a rotary encoder, an optical encoder, a magnetic sensor, or a Hall-effect sensor, for example, or any other type of sensor that is configured to sense the rotational position of lateral frame sections 204, 206 with respect to center section 202.

Elevation sensor 212 may be a laser, microwave, rotary encoder, optical encoder, magnetic sensor, or Hall-effect sensor, for example, or any other type of sensor that is configured to sense the elevation of center section 202 with respect to the ground G. Elevation sensor 212 may be configured to measure the height between center section 202 and a fixed point on the combine 120 to extrapolate the elevation of center section 202 with respect to the ground G.

Sensors 210 and 212 communicate with a control system 220 via a wired or wireless connection. Control system 220 includes a controller, processor and/or memory. Readings from sensors 210 and 212 are computed by control system 220 to determine the spatial positions of lateral frame sections 204, 206 and center section 202.

FIG. 3 depicts a hydraulic system 300 for adjusting the rotational position of lateral frame section 206 with respect to center section 202. Although lateral frame section 204 is omitted in this figure, it should be understood that lateral frame section 204 includes a similar, if not identical, hydraulic system 300 for adjusting the rotational position of lateral frame section 204 with respect to center section 202.

Hydraulic system 300 comprises a pump 302. Pump 302 may be dedicated to hydraulic system 300, or pump 302 may be a general pump disposed in combine 120. Pump 302 is configured to deliver fluid through inlet conduit 304 and into a cylinder 306. A shiftable piston 308 is disposed within the interior of cylinder 306. A shaft of piston 308 is connected to lateral section 206 for pivoting that section with respect to center section 202. Piston 308 delimits two internal chambers within cylinder 306. Inlet conduit 304 is configured to deliver fluid into one of those chambers, and the other chamber is fluidly connected to an outlet conduit 310. Fluid may be expelled from cylinder 306 via outlet conduit 310. The fluid pressure balance between the chambers influences the position of piston 308 within the interior of cylinder 306. It should be understood that cylinder 306 is connected to lateral frame section 206 and center section 202 such that cylinder 306 can pivot along with lateral frame section 206.

A valve 312 is connected to outlet conduit 310 to control the passage of fluid through outlet conduit 310. Valve 312 controlled by an actuator 316 that is connected to controller 220. Actuator 316 receives instructions from controller 220 for moving valve 312 between open and closed positions. Actuator 316 may be a linear actuator or a solenoid, for example.

In a closed position of valve 312, fluid is unable to escape from cylinder 306 through outlet conduit 310. Consequently, lateral frame section 206 is prevented from rotating with respect to center section 202. This may be referred to a locked state of lateral section 206. Conversely, in an open position of valve 312, fluid is permitted to escape from cylinder 306 through outlet conduit 310 and into reservoir 314 that is fluidly connected to outlet conduit 310. Consequently, lateral frame section 206 is permitted to rotate with respect to center section 202. This may be referred to an unlocked state of lateral section 206. Although not shown, a safety valve may be connected to outlet conduit 310 at a location upstream of valve 312 to prevent damage to hydraulic system 300 in a condition where the lateral frame section 206 is forced to move during operation of combine 120 while valve 312 is closed. Reservoir 314 and pump 302 are optional components of hydraulic system 300 and may be omitted. Also, pump 302 may be replaced by a computer controlled valve, for example, which is connected to a different pump.

Operation of pump 302 or the aforementioned computer controlled valve (not shown) may be controlled by control system 220 for adjusting the rotational position of lateral frame section 206 with respect to center section 202 in an automated fashion. The rotational position of lateral frame section 206 may also be outputted to a user display which receives data. Operation of valve 312 may also be controlled by control system 220 for locking the position of the lateral sections when it is desired to transport header 122 from one location to another.

FIG. 4 depicts a locking system 400 for locking the rotational position of lateral frame section 206 with respect to center section 202. Although lateral frame section 204 is omitted in this figure, it should be understood that lateral frame section 204 includes a similar, if not identical, locking system 400 for locking the rotational position of lateral frame section 204 with respect to center section 202.

Locking system 400 includes a latch 402 that is pivotably connected to lateral section 206 (see arrows for rotation). Latch 402 includes a barb 404 at its free end for engaging a complimentary-shaped recess 406 disposed on an exterior surface of center section 202. In a locked position of latch 402, in which barb 404 is situated within recess 406, latch 402 prevents lateral section 206 from moving downward with respect to center section 202. Latch 402 may be moved either manually by hand or automatically by an actuator 403, for example. Operation of the actuator 403 may be controlled by control system 220. The actuator 403 may be a linear actuator or a solenoid, for example.

Latch 402 may be used for locking lateral frame section 206 with respect to center section 202 in a stowed or raised position when it is desired to transport header 122 from one location to another. Also, the locking system 400 can be configured to lock the rotational position of lateral frame section 206 at multiple locations, as opposed to the single location shown in FIG. 4.

Those skilled in the art will readily recognize that various ways exist for locking the rotational position of lateral frame section 206 with respect to center section 202, and, thus, the invention is not limited to the locking system 400 that is shown herein. For example, the locking system 400 could comprise a latch, clamp, fastener, bolt, screw, nut, peg, protrusion, recess, tie, pin, and so forth.

Combine 120 may include both locking system(s) 400 and hydraulic system(s) 300 without departing from the spirit of the invention.

Turning back to FIG. 2, in the event that a component of articulating header 122 fails, it would still be desirable to use the combine 120 for harvesting in a failsafe mode. In the failsafe mode, the hydraulic system(s) 300 and/or the locking system 400 are manipulated to convert the header 122 from an articulating header to a non-articulating header. Various failure modes will be described in greater detail hereinafter.

Turning back to FIG. 3, for a combine 120 that includes the hydraulic system 300, but not necessarily the locking system 400, when the control system 220 determines that one of sensors 210 and/or 212 has failed, the control system 220 initiates the failsafe mode. In the failsafe mode, the control system 220 first alerts the user to the failure via a display. If the user desires to use header 122 in a non-articulating configuration, the user may then adjust the rotational position of the lateral sections 204 and 206 to a desired position using a keyboard, mouse or display of the control system 220, for example. Specifically, based upon the commands received from the user, control system 220 activates pumps 302 to adjust the rotational position of the lateral sections 204 and 206 to the desired position. Thereafter, control system 220 closes valve 312 to prevent movement of piston 308 within cylinder 306, thereby locking the rotational position of the lateral sections 204 and 206 with respect to center section 202. Thereafter, header 122 is maintained in a non-articulating state, and combine 120 may be used to harvest crop using the non-articulating header 122. At any point, control system 220 can open valve 312 to unlock the rotational position of the lateral sections 204 and 206 with respect to center section 202.

Turning now to FIG. 4, for a combine that includes the locking system(s) 400, but not the hydraulic systems 300, when the control system 220 determines that one of sensors 210 and/or 212 has failed, the control system 220 initiates the failsafe mode. In the failsafe mode, the control system 220 first alerts the user to the failure via a display. If the user desires to use header 122 in a non-articulating configuration, the user may then raise the lateral sections 204 and 206 with respect to the center section 202. The user then locks lateral sections 204 and 206 in fixed positions with respect to center section 202 by inserting barb 404 of each latch 402 within its respective recess 406. The inserting step may be performed manually or automatically by actuator 403 using control system 220. The lateral sections 204 and 206 are then lowered under their own weight until the weight of each lateral sections 204 and 206 is supported by a respective latch 402. At this point, all three sections 202, 204 and 206 of header 122 (as is shown in FIG. 2), which are locked together by latches 402, are aligned along the transverse axis 'A' of header 122, as shown in FIG. 2. Thereafter, header 122, which is non-articulating, may be used in a harvesting operation. The user may be prompted to perform the above steps either through the display or a user manual, for example.

Alternatively, for a combine that includes both the hydraulic system(s) 300 and the locking system(s) 400, when the control system 220 determines that one or both of the hydraulic systems 300 has failed, the control system 220 initiates the failsafe mode. In the failsafe mode, the control system 220 first alerts the user to the failure via a display. The user may then reduce the pressure in the cylinders 306 (i.e. bleed) of the lateral sections 204 and 206. The pressure reduction may be performed either manually or automatically by using one or more automated valves. Header 122 is then lowered onto the ground surface G causing all three sections 202, 204 and 206 of header 122 (as is shown in FIG. 2) to become aligned along the transverse axis 'A' of header 122. The user is then prompted to lock lateral sections 204 and 206 in fixed positions with respect to center section 202 by inserting barb 404 of each latch 402 within its respective recess 406. The inserting step may be performed manually or that step may be automated. Header 122 is then raised off of the ground G, and all three sections 202, 204 and 206 of header 122 (as is shown in FIG. 2), which are locked together by latches 402, remain aligned along the transverse axis 'A' of header 122, as shown in FIG. 2. Thereafter, header 122, which is now non-articulating, may be used in a harvesting operation.

It should be understood that latch 402 and/or valve 312 may be referred to herein as means for converting header 122 from an articulating header to a non-articulating header. Those skilled in the art will recognize that other means exist for converting header 122 from an articulating header to a non-articulating header, such as a lock, motor, gear, pin, actuator, solenoid, or fastener, for example. The converting means may be activated either mechanically, electrically or hydraulically, for example.

It is to be understood that the automated operational steps are performed by the controller of the control system 220 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein is implemented in software code or instructions which are tangibly stored on a tangible computer readable medium. Upon loading and executing such software code or instructions by the controller, the controller may perform any of the functionality of the controller described herein, including any steps of the methods described herein.

Referring now to FIG. 5, a method 500 for operating articulating header 122 in a failsafe mode generally comprises step 502 of monitoring the articulating header 122; step 504 of alerting a user when a fault condition is detected in the articulating header 122; and, step 506 of converting the articulating header 122 to a non-articulating header in response to the fault condition so that the combine harvester may be operated in a failsafe mode.

Step 502 may comprise monitoring one or more sensors 210, 212 on the header 122 that are configured to determine a position of an individual section 204, 206 of the articulating header 122. Step 502 may also comprise monitoring a hydraulic pressure of a hydraulic system 300.

Step 504 may indicate a fault condition in connection with the one or more sensors 210, 212.

Step 506 may comprise closing a valve 312 of a hydraulic system 300 of header 122 to either limit or prevent the individual section 204, 206 of the header 122 from moving with respect to a different section 202 of the header 122. Step 506 may also comprise actuating a latch 402 to either limit or prevent the individual section 204, 206 of the articulating header 122 from moving with respect to the different section 202 of the articulating header 122 when the monitoring step 502 indicates a fault in the hydraulic system 300. Step 506 may also comprise actuating an actuator 403 to move the latch 402 to the locked position. Step 506 may also comprise manually moving the latch 402 to the locked position.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

In light of all the foregoing, it should thus be apparent to those skilled in the art that there has been shown and described a control system for an articulating harvesting header, and a method of use thereof in the course of a failure mode. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A method for operating an articulating header of a combine harvester in a failsafe mode, the method comprising:
    monitoring the articulating header, wherein in an articulating configuration of the header, a first section of the header is permitted to rotate with respect to a second section of the header, and in a non-articulating configuration of the header, the first section of the header is prevented from rotating with respect to the second section of the header;
    alerting a user when a fault condition is detected in the articulating header; and
    converting the articulating header from the articulating configuration to the non-articulating configuration by actively locking the first and second sections of the header together in response to the fault condition so that the combine harvester may be operated in a failsafe mode.

2. The method of claim 1, wherein the monitoring step comprises monitoring one or more sensors on the header that are configured to determine a position of the first section of the articulating header, and the alerting step indicates a fault condition in connection with the one or more sensors.

3. The method of claim 1, wherein the header further comprises a hydraulic system for moving the first section of the articulating header with respect to the second section of the articulating header, and the converting step comprises closing a valve of the hydraulic system to actively lock the first and second sections of the header together to prevent the first section of the articulating header from moving with respect to the second section of the articulating header.

4. The method of claim 3, wherein the hydraulic system comprises a piston cylinder apparatus that is connected to the first section of the articulating header and the second section of the articulating header, wherein the piston cylinder apparatus is fed with hydraulic fluid to move the first section of the articulating header with respect to the second section of the articulating header.

5. The method of claim 1, wherein the header further comprises a latch for actively locking the first section of the articulating header with respect to the second section of the articulating header, and the converting step comprises actuating the latch to prevent the first section of the articulating header from moving with respect to the second section of the articulating header.

6. The method of claim 5, wherein the header further comprises an actuator for moving the latch to a locked position.

7. The method of claim 5, wherein the converting step comprises manually moving the latch to a locked position.

8. The method of claim 1, wherein sections of the header are aligned along a transverse axis when the header is positioned in the non-articulating configuration.

9. The method of claim 1, wherein the header further comprises a hydraulic system for moving the first section of the articulating header with respect to the second section of the articulating header, and the monitoring step comprises monitoring a hydraulic pressure of the hydraulic system.

10. The method of claim 9, wherein the header further comprises a latch for locking the first section of the articulating header with respect to the second section of the articulating header, and the converting step comprises actuating the latch to prevent the first section of the articulating header from moving with respect to the second section of the articulating header when the monitoring step indicates a fault in the hydraulic system.

11. The method of claim 10, wherein the header further comprises an actuator for moving the latch to a locked position, and the converting step comprises actuating the actuator to move the latch to the locked position.

12. The method of claim 10, wherein the converting step comprises manually moving the latch to a locked position.

13. An articulating header of a combine harvester that is configured to be operated in a failsafe mode, the articulating header comprising:
    a first section of the header that is rotatably connected to a second section of the header, wherein in an articulating configuration of the header, the first section of the header is permitted to rotate with respect to the second section of the header, and in a non-articulating configuration of the header, the first section of the header is prevented from rotating with respect to the second section of the header;
    a controller that is configured to determine a fault condition in the articulating header; and
    means for converting the articulating header from the articulating configuration to the non-articulating configuration in response to the fault condition by actively locking the first and second sections of the header together so that the combine harvester may be operated in the failsafe mode.

14. The articulating header of claim 13, further comprising one or more sensors on the header that are configured to determine a position of the first section of the articulating header, and the controller is configured for monitoring the one or more sensors.

15. The articulating header of claim 13, wherein the header further comprises a hydraulic system for moving the first section of the articulating header with respect to the second section of the articulating header, and the conversion means comprises a valve of the hydraulic system that is configured to actively lock the first and second sections together to prevent the first section of the articulating header from moving with respect to the second section of the articulating header.

16. The articulating header of claim 15, wherein the hydraulic system comprises a piston cylinder apparatus that is connected to the first section of the articulating header and the second section of the articulating header for moving the first section of the articulating header with respect to the second section of the articulating header.

17. The articulating header of claim 13, wherein the conversion means comprises a latch for locking the first section of the articulating header with respect to the second section of the articulating header to prevent the first section of the articulating header from moving with respect to the second section of the articulating header.

18. The articulating header of claim 17, wherein the header further comprises an actuator for moving the latch to a locked position.

19. The articulating header of claim 13, wherein the header further comprises a hydraulic system for moving the first section of the articulating header with respect to the second section of the articulating header, and the controller is configured to monitor a hydraulic pressure of the hydraulic system.

20. The articulating header of claim 19, wherein the conversion means comprises a latch for locking the first section of the articulating header with respect to the second section of the articulating header when a fault occurs in the hydraulic system.

21. The articulating header of claim 1 further comprising a crop conveyor disposed on the first and second sections of the header.

\* \* \* \* \*